(12) United States Patent
Breuer et al.

(10) Patent No.: US 6,306,239 B1
(45) Date of Patent: Oct. 23, 2001

(54) METHOD OF FABRICATING A STRINGER-STIFFENED SHELL STRUCTURE USING FIBER REINFORCED COMPOSITES

(75) Inventors: Ulf Breuer, Grasberg; Jochen Mueller, Bremen, both of (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/356,214

(22) Filed: Jul. 16, 1999

(30) Foreign Application Priority Data

Jul. 18, 1998 (DE) .............................................. 198 32 441

(51) Int. Cl.$^7$ ..................................................... B32B 31/04
(52) U.S. Cl. ........................ 156/245; 156/285; 156/307.1
(58) Field of Search ..................................... 244/123, 124, 244/126; 428/119, 120; 52/84; 264/511, 552, 571; 156/285, 306.6, 306.9, 307.1, 222, 224, 245; 269/909, 900, 287

(56) References Cited

U.S. PATENT DOCUMENTS

| | | | |
|---|---|---|---|
| 3,568,289 | * | 3/1971 | Jenkins et al. .............................. 29/0 |
| 4,786,343 | * | 11/1988 | Hertzberg ................................ 156/93 |
| 4,908,254 | * | 3/1990 | Fisher et al. ........................... 428/119 |
| 5,896,637 | * | 4/1999 | Sarth ........................................ 29/34 |
| 6,007,894 | * | 12/1999 | Barnes et al. .......................... 428/120 |

OTHER PUBLICATIONS

U. Bieling, "Serieneinsatz von Faserverbundwerkstoffen im Flugzeugbau—dargestellt am Seitenleitwerk des Airbus" VDE Berichte Nr. 965.1 1992, pp. 77–98.

Jean Rouchon, "Certification of Large Airplane Composite Structures, Recent Progress and New Trends in Compliance Philosophy" Proceedings of the 17th Conference Stockholm, Sweden, 1990, pp. 1439–1447.

* cited by examiner

Primary Examiner—Michael W. Ball
Assistant Examiner—Gladys Piazza
(74) Attorney, Agent, or Firm—W. F. Fasse; W. G. Fasse

(57) ABSTRACT

A method for fabricating a stringer-stiffened shell structure using fiber composite materials involves the following steps. A fiber reinforced skin member having a specified surface curvature is laid onto a correspondingly curved mold surface of a shell mold. Stringer core blanks are cut from a cured plate of fiber composite material, whereby each blank has a narrow edge with a curvature matching the curvature of the skin member. These stiff pre-cut blanks are arranged extending along and vertically protruding from the skin member, with the narrow edges of the blanks lying in contact along the skin surface. An auxiliary frame is placed around the perimeter of the shell mold, and the ends of the stringer core blanks are received in slots in the frame to hold the blanks in proper positions. Then, stiffening profile members are laid lengthwise along and against the stringer core blanks and the adjoining areas of the skin member, whereby these profile members are made of uncured fiber composite material so that they are easily deformable along the skin member and the stringer core blanks. The assembled structure is pressurized and cured so as to integrally bond the components to each other and fully cure and harden all of the components. A stiffening stringer of the finished structure is formed by a respective stringer core blank sandwiched between two adjoining stiffening profile members.

25 Claims, 1 Drawing Sheet

METHOD OF FABRICATING A STRINGER-STIFFENED SHELL STRUCTURE USING FIBER REINFORCED COMPOSITES

PRIORITY CLAIM

This application is based on and claims the priority under 35 U.S.C. §119 of German Patent Application 198 32 441.3, filed on Jul. 18, 1998, the entire disclosure of which is incorporated herein by reference.

FIELD OF THE INVENTION

The invention relates to a method for manufacturing or fabricating a shell structure that is stiffened with stringers using fiber reinforced composite materials molded on a shell mold. The method may be used to fabricate complexly shaped fiber reinforced synthetic structures that include a shell-shaped skin and profile members or stringers stiffening this skin. The method may be used for the fabrication of all stringer-stiffened shell structures with fiber reinforced composite materials, but is particularly applicable for fabricating the rudder and vertical stabilizer assembly, the elevator and horizontal stabilizer assembly, and the wings of aircraft with particular technological advantages.

BACKGROUND INFORMATION

It is generally known in the art to use stringer-stiffened structures made of fiber composite materials in the field of aircraft construction. For example, these may be used as primary structures of a passenger aircraft, whereby the primary application known in the art is the empennage or rudder and vertical stabilizer assembly of known Airbus aircraft, which is completely fabricated of carbon fiber reinforced composite materials. In this context, two publications each provide certain impressions or ideas for realizing the known stringer-stiffened structures using fiber composite materials. See U. Bieling, "Serieneinsatz von Faserverbundwerkstoffen im Flugzeugbau—dargestellt am Seitenleitwerk des Airbus", "Series Application of Fiber Composite Materials in Aircraft Construction—Represented in the Rudder and Vertical Stabilizer Assembly of the Airbus", VDI Berichte No. 965.1, pages 77 to 88, VDI publishers Düsseldorf, Germany, 1992; and also J. Rouchon, "Certification of Large Aircraft Composite Structures, Recent Progress and New Trends in Compliance Philosophy", Proceedings of the 17th ICAS Conference Stockholm, Sweden, 1990.

In part, Bieling discusses the fabrication of stiffening internal structures of highly integrated carbon fiber composite components for a middle shell or middle box of a rudder and stabilizer assembly. Among other things, Bieling also addresses the complex fabrication that is required in the so-called modular core technology. In this context, Bieling discusses in detail the fabrication process for a middle box shell of a rudder and stabilizer assembly, in which the carbon fiber composite pre-cut blanks that are supplied in a sorted manner must first be separated into skin layers and so-called bandages. The skin layers are manually laid into laminating molds, while the bandages are wrapped or wound around the so-called modular cores in a partially automated process. Multiple layers of these bandages are wrapped around the cores in a single process operation, when rectangular modular cores are used for the shells of the rudder and stabilizer assembly. The entire wrapping or winding process involves high technical demands, especially requiring a sufficiently high and reproducible adhesive bonding characteristic of the prepregs. In this context, trapezoidal or geometrically complex modular cores must be manually wrapped layer by layer.

Thereafter, the wrapped modular cores are arranged in a row in an exactly prescribed order on a rotatable support. In this context, the prepregs arranged between the lined-up modular cores, after curing, form the stiffening internal structure of the highly integrated carbon fiber composite components. After completion of a subsequent laminating process for the skin layers and fixing of all the modular cores, the rotatable support is rotated in such a manner that all of the cores hang downward, and then the rotatable support is lowered down onto the skin layers laying in the laminating mold. After releasing the cores from the rotatable support, the cores remain on the laminating form and the component is made ready for the curing process.

After the curing has been completed, the components are removed from the forming mold. In this context, first the middle parts of the three-part modular cores and thereafter the side parts are removed or pulled out of the component. After all of the core parts have been removed, the component is lifted out of the forming mold and subjected further to a mechanical machining. The modular cores are cleaned of any residual resin and then once again provided with separating members. The laminating mold is cleaned and provided with separating members. To repeat the above described steps of the process, the individual core parts are then joined together again to form a modular core which is used for carrying out the next wrapping process. After all of the above mentioned steps have been carried out, the components are subsequently mechanically machined, for example by boring, milling, perimeter machining or flash removal or the like, and are then subjected to a non-destructive testing.

It is desirable to use fiber composite materials for the primary structures such as an empennage, e.g. a rudder and stabilizer assembly, of an aircraft in view of the many advantages such as a weight reduction, very good specific strength and stiffness characteristics, a reduced total number of individual components, very good corrosion resistance, very good fatigue performance, among others. However, from the above description of the known fabrication processes, it is clear that further improvements in the fabrication of such primary structures are desirable or even necessary to achieve a rational fabrication with a low expense and effort in the way of tooling, equipment, and process steps, while reliably meeting the high technical demands that are typical in the field of aircraft construction. These considerations especially apply in the construction of high capacity civilian commercial aircraft. A further subordinate requirement is the use of rationalized production technologies for achieving stiffened primary structures using fiber composite materials, which may be applied to empennage structures as well as the wings of aircraft.

For the above reasons, it is important in the field to effectively accommodate or adapt known production techniques in order to achieve the simplest possible application of stiffening members such as stringers onto complexly curved shells or skin layers. In this context, it is generally known in the field that significant problems arise when fitting stiffening members such as stringers onto the curved shells or skin layers in the production of stringer-stiffened structures of fiber composite materials. When pre-fabricated and pre-cured stiffening members are combined with a shell or skin structure having a relatively sharp curvature, various assembly and fabrication difficulties arise in achieving a proper alignment and conformance of the parts, and ultimately a warping deformation of the finished component results due to imperfect matching or conformance of the various parts. On the other hand, any attempt to use non-cured semifinished parts for the stiffening members have previously always required the use of very complicated and costly molds or forming tools for properly molding the stiffening members, bonding or joining the stiffening members onto the shell structure, and curing the stiffening members. The above mentioned publications of Bieling and Rouchon provide no disclosure or suggestions toward how the fabrication of complexly shaped stringer-stiffened structures can be improved while simultaneously avoiding the above mentioned problems.

SUMMARY OF THE INVENTION

In view of the above, it is an object of the invention to provide a method of fabricating or manufacturing a stringer-stiffened shell structure using fiber composite materials, which combines the advantages and avoids the disadvantages of using pre-cured stiff components and un-cured deformable components in combination to form the stiffening stringers. The inventive method aims to make it possible to use pre-fabricated hard material blanks that have a curvature exactly matched to that of the shell structure, to serve both as forms or molding cores for the stringers during the fabrication process and also as strengthening elements in the finished structure. It is a further object of the invention to completely avoid the need for complicated and cost-intensive forming tools or molds for the curing process, and particularly for the stringers. The invention also aims to completely avoid an undesirable warping deformation of the finished component as a result of curvature caused by the shape of the pre-cut material blanks. The invention further aims to avoid or overcome the disadvantages of the prior art, and to achieve additional advantages, as apparent from the present specification.

The above objects have been achieved according to the invention in a method for fabricating a stringer-stiffened shell structure using fiber composite materials, wherein the shell structure is molded on a shell mold. According to the invention, a hard fiber reinforced skin is laid onto the curved surface of the shell mold. The hard fiber reinforced skin has a curvature that matches and conforms to the curved surface of the shell mold. Then, at least one vertically arranged fiber reinforced stiff strip-shaped pre-cut stringer core blank is positioned to extend along the skin, whereby a narrow edge of the stringer core blank has a curvature corresponding to the curvature of the skin and lies conformingly in contact on the skin.

Next, a respective lengthwise extending, deformable, fiber-reinforced stiffening profile member is laid against and along each respective broad side of the pre-cut stringer core blank. Each one of these lengthwise stiffening profile members has a contact surface that contacts the skin and adapts conformingly to the curvature of the skin, and a protruding web that conformingly contacts the broad side face of the stringer core blank. There-after, the entire assembly or construction is packed or sealed in a vacuum-tight manner and subjected to the external application of pressure and heat, which causes the various elements of the overall structure to be adhesively bonded to each other and to be cured and hardened in this condition. Particularly, each lengthwise stiffening profile member undergoes a rigid and permanently unreleasable mechanical joining or bonding with the pre-cut stringer core blank on the one hand and with the skin on the other hand, during the curing process.

In the above process, the hard skin member and the stiff pre-cut stringer core blank have the prescribed contour or curvature and positions relative to each other and thereby serve as a mold member or forming core against which the lengthwise stiffening profile members are shaped and adapted during the assembly and curing process. Once the entire assembly is fully cured and hardened, the lengthwise stiffening profile members serve to provide a strong and permanent connection between the pre-cut stringer core blank and the skin member, and also provide stiffening and strengthening of the finished structure with the cured and hardened webs or flanges of the stiffening profile members. Namely, a respective stringer is formed by one of the stringer core blanks sandwiched between the protruding webs of the two adjoining stiffening profile members, while the stringer is integrally bonded to the shell or skin member by the base webs and contact surfaces of the stiffening profile members.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

The invention provides a technology and a process for fabricating stringer-stiffened shell structures having a complex curved configuration, wherein the stringers can be formed to the curvature of a skin or shell member in a simple manner without using additional cost-intensive tools or process steps. The skin or shell member is known in the art as such due to its structure, composition, and appearance, and generally has a configuration of a curved panel with length and width dimensions that are substantial multiples of the relatively small thickness dimension. The fabrication of such stringer-stiffened shells according to the invention requires substantially less effort and expense than the conventional technologies discussed above.

Figure 1:
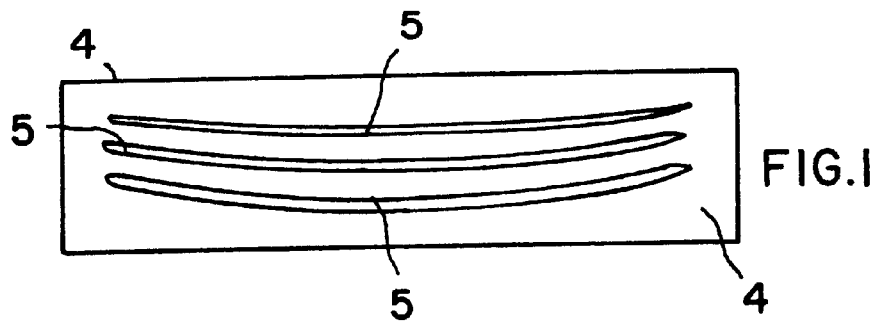
FIG. 1 is a schematic plan view of a plate of fiber rein forced composite material from which strip-shaped stringer core blanks are cut.

In order to carry out the fabrication method according to the invention, it is first necessary to provide pre-cut strip blanks or so-called "blades" or stringer core blanks 5 of fiber reinforced material in a preliminary step. Preferably, as schematically represented in FIG. 1, the stringer core blanks 5 are cut from a previously laminated or pressed and fully cured and hardened plate 4 of fiber reinforced composite material. The blanks 5 have a strip shape, namely an elongated shape with two narrow edges, two broad side faces, and an elongation length that is substantially greater than the dimensions of the narrow edges and of the broad side faces. At least one of the narrow edges has a contour shape matching the contour shape of the skin member to which the stringer core strip will be joined.

FIG. 1 shows a plan view of the hard flat plate 4, and thereby shows the side view shape and particularly the pre-defined curvature of each pre-cut stringer core blank 5. It should be noted that the pre-cut stringer core blanks 5 have already been cut out of the plate 4 as shown in FIG. 1, so that only the remaining holes in the plate 4 are evident. Alternatively, FIG. 1 could be taken as showing a situation in which the pre-cut blanks 5 have already been cut or separated from the remaining material of the plate 4, but have not yet been removed therefrom. The cutting can be carried out by any known means, such as stamping, saw cutting, laser cutting, water jet cutting, hot wire cutting or the like. It is well understood in the art how the exactly required curved configuration of each pre-cut stringer core blank 5 can be achieved, for example using a computer numerical control for the cutting process.

Figure 2:
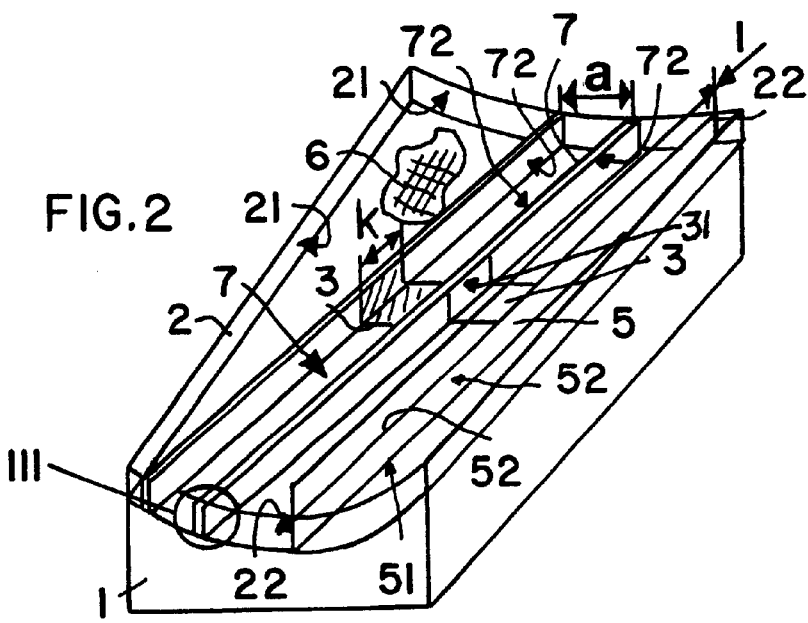
FIG. 2 is a schematic perspective view of strip-shaped stringer core blanks and lengthwise stiffening profile members arranged on a curved skin shell that is supported on a shell mold cooperating with an auxiliary jig frame resting on the perimeter of the mold for fabricating a stringer-stiffened shell structure.

The pre-cut stringer core blanks 5 that have been previously prepared in the above mentioned manner are thereafter integrated into the construction in carrying out the process as shown in FIG. 2. Thereby the stringer core blanks 5 will serve as forming cores or guides during the process, and will serve as strengthening cores of finished stringers that stiffen the shell structure in the finished product which has been fully cured and hardened.

FIG. 2 shows a stationarily arranged shell mold 1 having a mold surface with a predefined curvature, which may involve a curvature in one plane or two planes for example. A curved shell or skin member 6, which consists of one or more layers of fiber reinforced material and which is to be stiffened with stringers, is laid onto the curved surface of the shell mold 1. The curvature of the skin or shell member 6 is matched or adapted to the curved surface of the shell mold 1 in a surfacially conforming manner. The skin member 6 may be a pre-fabricated, pre-curved member that has been previously fully cured and hardened in a configuration matching that of the curved surface of the shell mold 1. Alternatively, the skin member 6 may not yet be cured and hardened or only partially cured and hardened so that its curvature remains flexible and conformable when it is placed onto the shell mold 1. Preferably, the skin member 6 has been previously cured and hardened and may be a prefabricated stock component that is stored until needed.

Once the skin member 6 has been laid onto the curved surface of the shell mold 1, a plurality of hard pre-cut stringer core blanks or blades 5 are positioned to extend along a strip length 1 along the upper surface of the skin member 6. Particularly, one of the two narrow edges 51 of each pre-cut stringer core blank 5 is in contact with the surface of the skin member 6, while the width of the respective stringer core blank along the broad side faces 52 extends substantially vertically or perpendicularly relative to the local surface of the skin member 6. The pre-cut curvature of the narrow edge 51 that lies in contact with the surface of the skin member 6 corresponds to or mates with the curvature of the surface of the skin member 6 at each respective location. This is achieved by properly cutting or shaping the respective stringer core blank 5 so that its narrow edge 51 has the proper curvature as seen in a side view and as discussed above in connection with FIG. 1.

The vertical positioning of the stringer core blanks 5 may, for example, be carried out with the aid of an auxiliary jig frame 2 that is set onto the shell mold 1 around the perimeter thereof, so as to establish the proper positioning and spacing of the stringer core blanks 5. To achieve this, the inwardly facing sides of the wall 21 of the auxiliary frame 2 are provided with slits or slots 22 that extend substantially vertically overall, or locally perpendicular relative to the local surface of the skin member 6, and with defined spacing distances between adjacent slits 22. Specifically, the slits 22 are formed as grooves or recesses in the wall 21 of the auxiliary frame 2. The end portions of the stringer core blanks 5 are inserted into the respective slits 22 so as to hold and properly position the stringer core blanks 5. Moreover, thereby the stringer core blanks 5 are held parallel to each other and properly positioned in their vertical orientation with the respective narrow edges 51 thereof held and pressed against the surface of the skin member 6.

Next, a respective lengthwise extending stiffening profile member 7 is laid between respective adjacently paired ones of the stringer core blanks 5. Specifically, each stiffening profile member 7 is laid along and in contact with a broad side 52 of a respective stringer core blank 5 and along the adjoining surface of the skin member 6. The details regarding the configuration and arrangement of the lengthwise stiffening profile members 7 will now be described in connection with FIGS. 2 and 3.

Figure 3:
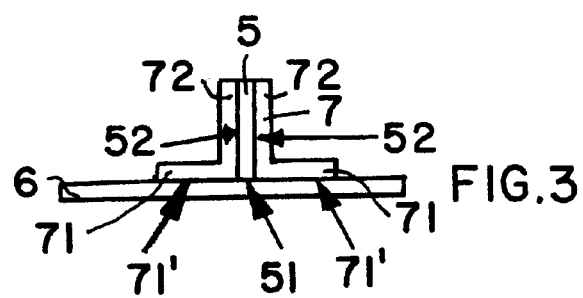
FIG. 3 shows an enlarged detail end view of the detail area III in FIG. 2.

The stiffening profile members 7 are U- or L-sectional profile members consisting of fiber reinforced composite material which may be in a raw or non-cured state or in a merely partially cured state when it is used in the process as shown in FIGS. 2 and 3. In this context, the stiffening profile members 7 may be pre-formed and resin pre-impregnated prepreg intermediate parts. As an alternative, the stiffening profile members 7 may be blanks of fiber textile materials pre-cut to the required shape and laminated with a resin film.

The profile members extend along the length of the stringer core blanks 5 in the direction of the strip length 1, and each respectively include a protruding web 72, which can represent a vertically oriented flange of a U-sectional profile member or a vertically oriented shank of an L-sectional profile member, as well as a base web or shank 71 including a contact surface 71' extending substantially horizontally along the surface of the skin member 6. The vertically oriented protruding web 72 of each stiffening profile member 7 extends in a form-fitting manner along a respective lengthwise extending broad side 52 of the respective stringer core blank 5. On the other hand, the base web 71 of a respective stiffening profile member 7 runs with its contact surface 71' in a form-fitting manner along the curved surface of the skin member 6 adjoining the stringer core blank 5. In a case of a U-sectional profile member, two of the vertically protruding webs 72 are interconnected by the base web 71, whereby these two protruding webs 72 respectively run along the opposite facing broad sides 52 of two adjacent stringer core blanks 5.

While laying the lengthwise stiffening profile members 7 onto the assembly (and thereafter while pressurizing and curing the assembly) during the fabrication process, the stiffening profile members 7 are flexible and deformable because they are not yet cured or only partially cured as mentioned above. Thereby, the vertically protruding webs 72 of the stiffening profile members 7 are easily conformed to the shape of the broad sides 52 of the stringer core blanks 5, while the base webs 71 are similarly conformed to the curved shape of the surface of the skin member 6. This can be achieved by a manual lay-up process or by a semiautomated or completely automated lay-up process of laying the stiffening profile members 7 into position along the stringer core blanks 5 and the adjoining surface of the skin member 6 and then smoothing or pressing the profile members 7 along and against the stringer core blanks 5 and the surface of the skin member 6.

The assembly of the stringer core blanks 5 and lengthwise stiffening profile members 7 described above may then be directly subjected to a curing process as will be described below. However, as an alternative, an additional strengthening and fixing of the above described arrangement of stringer core blanks 5 and stiffening profile members 7 on the skin member 6 may be provided before the curing process, as follows. Respective additional stiffening or strengthening profile members 3 that are made of fiber reinforced composite or metal and that have a relatively short length k may be arranged at prescribed locations between the parallel extending stringer core blanks 5, for example at the midpoint and at regular spacings along the strip length 1 of the blanks 5. Preferably, each short strengthening profile member 3 has a U-sectional profile shape, but may instead have an L-sectional profile shape.

These short strengthening profile members 3 are pre-fabricated, stiff, hard and rigid auxiliary insert members that are fitted and pressed into the spaces between the protruding webs 72 of the lengthwise extending stiffening profile members 7 lying along the broad side faces 52 of the stringer core blanks 5, in order to exactly position the stiffening profile members 7 and stringer core blanks 5 relative to each other and fix the horizontal spacing and positioning of these members relative to each other. In this context, the protruding webs 31 of the short strengthening profile members 3 are pressed to extend in contact along the protruding webs 72 of the lengthwise extending profile members 7. This achieves a wedging or jamming action in the manner of a type-setting box, which practically prevents a sliding or shifting displacement of the non-cured stiffening profile members 7 in a horizontal direction.

The above described assembled or laid-up structure is then packed in a vacuum-tight manner, in order to carry out a curing process is in an autoclave. For example, the assembled structure can be "bagged" in a conventional manner for bag molding, is then optionally subjected to vacuum for gas extraction, and is then subjected to pressure and heat in the autoclave to press the profile members 3 and 7 against the stringer core blanks 5 and the surface of the skin member 6. Thereby the components of the assembled structure are adhesively bonded intimately and securely to each other and then completely cured in this condition.

During the curing process, the protruding webs 72 of the stiffening profile members 7 are securely adhesively bonded to the stringer core blanks 5, by an intermingling or interpenetration of the resin of the non-cured protruding webs 72 into the pre-cured or partially pre-cured stringer core blanks 5. Similarly, the base webs 71 of the stiffening profile members 7 are securely adhesively bonded to the contacting surface area of the skin member 6 by the resin of the members 7. It is simply necessary that compatible resins and reinforcing fiber materials are used for the various components, but it is especially preferred that the same fiber composite material is used for each of the components. Thereby, during the curing process, a rigid, secure and permanent mechanical connection among the components is achieved.

Thereafter the hardened structure is removed from the autoclave and from the vacuum-tight packing such as a curing and molding bag. In the finished, hardened, and completely cured integral composite structure, respective stiffening stringers are each formed by one of the stringer core blanks 5 sandwiched between two protruding webs 72 of the two adjoining stiffening profile members 7, for example as shown especially in the detail of FIG. 3. It should be noted that the detailed view of FIG. 3 ignores or omits the curvature of the skin member 6. The molded form or configuration as well as the position and longitudinal extension of each stringer is determined by the molding and fixing of the adjoining stiffening profile members 7 onto the previously hardened and properly shaped stringer core blank 5. The position of the stringers relative to each other is fixed by the strengthening members 3. There is no need of providing a complicated molding tool for molding the shape of each stringer on the skin member.

The additional short strengthening profile members 3 that wedged the stringer bodies into position may remain rigidly connected to these stringers in the finished product, for example, as a securing point for ribs or the like that are to be added later, and as additional local strengthening and/or mounting points in the finished composite structure. Alternatively, the auxiliary strengthening profile members 3 can be removed from the resulting structure after the curing step, whereby these members 3 are seen merely as molding auxiliary inserts that can be reused for subsequent molding operations.

The described method for carrying out a one step fabrication of complexly shaped stringer-stiffened shell structures using fiber composite materials makes it possible to easily adapt the shape of the stringers to any desired curved or complexly configured skin member 6. It is simply necessary to pre-cut the stiff or hard blades or stringer core blanks 5 to have the proper curvature along the narrow edge 51 that will be in contact with the skin member 6, and then to form the deformable stiffening profile members 7 therealong during the fabrication process. With this method, it is also possible to use stringer core blanks or blades 5 that are not straight or linear, so as to form finished stringers that are not linear. The various devices such as jigs and molding tools that have previously been necessary for establishing the form and for supporting the non-cured structure are no longer necessary, or at least are not necessary to the extent previously required. As a result, the expense and effort necessary for manufacturing the molding tools, releasing the finished components from the molding tools, cleaning the molding tools and the like, is substantially reduced. Additional or subsequent changes of the wall thickness of the form parts require substantially lower efforts in view of the few forming tools that are still required.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The terms soft, flexible, deformable and uncured herein refer to the characteristics of a fiber composite component that is not yet fully cured, while the terms hard, stiff and rigid (or substantially so) refer to the characteristics of a fiber composite component that has been fully cured and do not necessarily imply complete rigidity and stiffness.

What is claimed is:

1. A method of fabricating a stringer-stiffened shell structure including a fiber reinforced composite material, said method comprising the following steps:
   a) providing a skin member comprising a first fiber reinforced composite material having opposite first and second skin surfaces;
   b) laying said skin member onto a mold surface of a shell mold so that said first skin surface lies conformingly on said mold surface and said skin member has a skin contour configuration matching a mold surface contour of said mold surface;
   c) providing a pre-cured strip-shaped stringer core blank comprising a pre-cured second fiber reinforced composite material and having a narrow edge and two opposite broad side faces extending along a strip length;

d) arranging said stringer core blank on said skin member which is lying on said mold surface, such that said narrow edge of said stringer core blank lies conformingly in contact on said second skin surface of said skin member and said broad side faces of said stringer core blank extend away from said skin member, and wherein said narrow edge of said stringer core blank has an edge contour configuration matching said skin contour configuration where said narrow edge is in contact with said second skin surface;

e) providing a flexibly deformable elongate stiffening profile member which is more flexible than said stringer core blank and which comprises a flexible third fiber reinforced composite material and includes a lengthwise extending base web and a lengthwise extending protruding web that runs along and protrudes from said base web;

f) laying said stiffening profile member with said protruding web lying conformingly in contact along one of said broad side faces of said stringer core blank and with said base web lying conformingly in contact along said second skin surface adjacent to said stringer core blank, wherein said stringer core blank acts as a molding form against which said protruding web of said stiffening profile member is conformed during this step f); and g) carrying out a hardening process wherein said stiffening profile member hardens and becomes rigidly and intimately bonded with said stringer core blank and with said skin member, and wherein said stringer core blank becomes a structural strengthening core of a stringer made up of at least said stringer core blank and said stiffening profile member upon completion of this step g).

2. The method according to claim 1, wherein said mold surface contour, said skin contour configuration, and said edge contour configuration each respectively comprise a curved contour.

3. The method according to claim 1, wherein said step a) comprises providing said skin member as a panel of said first fiber reinforced composite material that has been pre-formed to have said skin contour configuration and that has been pre-cured.

4. The method according to claim 1, wherein, in said step c), said stringer core blank has a rigidity defined by said second fiber reinforced composite material that has been pre-cured, and said stringer core blank has been pre-cut so that said narrow edge has said edge contour configuration.

5. The method according to claim 1, wherein said step a) comprises providing said skin member as a panel of said first fiber reinforced composite material that has not been fully cured and remains flexibly deformable, and said step b) further comprises flexibly deforming said skin member to conform said skin contour configuration to said mold surface contour.

6. The method according to claim 1, wherein said first, second and third fiber reinforced composite materials all comprise the same reinforcing fiber material and the same resin material.

7. The method according to claim 1, wherein said step f) comprises laying said stiffening profile member along said stringer core blank to extend entirely along said strip length of said stringer core blank.

8. The method according to claim 1, wherein said step g) comprises packing an assembly of said skin member, said stringer core blank and said stiffening profile member assembled in accordance with steps a) to f), in a vacuum tight manner, and then subjecting said assembly to heat and pressure to carry out said hardening process.

9. The method according to claim 1, wherein said step c) comprises cutting said stringer core blank out of a fiber reinforced composite plate that has been previously cured and hardened.

10. The method according to claim 1, wherein said step e) comprises providing two of said stiffening profile member, and said step f) comprises laying said two stiffening profile members respectively along said two opposite broad side faces of said stringer core blank.

11. The method according to claim 10, wherein said step e) comprises providing said stiffening profile members as not yet fully cured members of said third fiber reinforced composite material.

12. The method according to claim 10, wherein said step e) comprises providing said stiffening profile members as uncured members of said third fiber reinforced composite material.

13. The method according to claim 10, wherein said step e) comprises providing said stiffening profile members as pre-preg intermediate products by pre-forming and pre-impregnating a fiber material with a resin, or as a fiber textile blank by pre-cutting a blank from a fiber textile material and pre-laminating a resin film onto said blank of fiber textile material, and whereon said step g) comprises applying pressure and heat which cause a further molding deformation of said stiffening profile members against said stringer core blank and said skin member.

14. The method according to claim 1 wherein said step e) comprises providing two respective ones of said stiffening profile member, and said step f) comprises laying said two stiffening profile members with the respective protruding webs thereof lying conformingly in contact along said two opposite broad side faces of said stringer core blank, and wherein said stringer core blank and said two protruding webs of said two stiffening profile members together form a stiffening and strengthening stringer on said skin member upon completion of said step g).

15. The method according to claim 14, wherein each of said two stiffening profile members has an L-shaped cross-sectional profile formed by said protruding web and said base web thereof.

16. The method according to claim 14, wherein each one of said two stiffening profile members includes two of said protruding webs respectively protruding from opposite edges of said base web, so that each one of said two stiffening profile members has a U-shaped cross-sectional profile formed of said two protruding webs and said base web thereof, wherein said step c) comprises providing two respective ones of said stringer core blank, wherein said step d) comprises arranging said two stringer core blanks spaced apart from each other along said skin member, and wherein said step f) comprises laying each of said two stiffening profile members so that said two protruding webs thereof respectively lie conformingly along said broad side faces of said two stringer core blanks that face toward each other with said stiffening profile member therebetween.

17. A method of fabricating a stringer-stiffened shell structure including a fiber reinforced composite material, said method comprising the following steps:

a) providing a skin member comprising a first fiber reinforced composite material having opposite first and second skin surfaces;

b) laying said skin member onto a mold surface of a shell mold so that said first skin surface lies conformingly on said mold surface and said skin member has a skin contour configuration matching a mold surface contour of said mold surface;

c) providing a strip-shaped stringer core blank comprising a second fiber reinforced composite material and having a narrow edge and two opposite broad side faces extending along a strip length;

d) arranging said stringer core blank on said skin member which is lying on said mold surface, such that said narrow edge of said stringer core blank lies conformingly in contact on said second skin surface of said skin member and said broad side faces of said stringer core blank extend away from said skin member, and wherein said narrow edge of said stringer core blank has an edge contour configuration matching said skin contour configuration where said narrow edge is in contact with said second skin surface;

e) providing an auxiliary jig frame including a frame wall defining a perimeter of said frame and having slits in said frame wall facing each other pairwise inwardly across an area bounded within said perimeter, and arranging said auxiliary jig frame on said shell mold with respective ends of said stringer core blank received and supported in said slits, wherein said auxiliary jig frame holds said stringer core blank in a position protruding substantially perpendicularly from said second skin surface;

f) providing a flexibly deformable elongate stiffening profile member which is more flexible than said stringer core blank and which comprises a flexible third fiber reinforced composite material and includes a lengthwise extending base web and a lengthwise extending protruding web that runs along and protrudes from said base web;

g) laying said stiffening profile member with said protruding web lying conformingly in contact along one of said broad side faces of said stringer core blank and with said base web lying conformingly in contact along said second skin surface adjacent to said stringer core blank; and h) carrying out a hardening process wherein said stiffening profile member hardens and becomes rigidly and intimately bonded with said stringer core blank and with said skin member.

18. The method according to claim 17, wherein said step c) comprises providing plural respective ones of said stringer core blank, and said step d) comprises arranging said respective ends of each of said plural stringer core blanks in respective pairs of said slits so that said auxiliary jig frame holds said plural stringer core blanks to extend along said second skin surface of said skin member spaced apart from each other at a defined spacing distance.

19. The method according to claim 18, wherein said defined spacing distance is fixed by a spacing between adjacent ones of said slits.

20. A method of fabricating a stringer-stiffened shell structure including a fiber reinforced composite material, said method comprising the following steps:

a) providing a skin member comprising a first fiber reinforced composite material having opposite first and second skin surfaces;

b) laying said skin member onto a mold surface of a shell mold so that said first skin surface lies conformingly on said mold surface and said skin member has a skin contour configuration matching a mold surface contour of said mold surface;

c) providing a strip-shaped stringer core blank comprising a second fiber reinforced composite material and having a narrow edge and two opposite broad side faces extending along a strip length;

d) arranging said stringer core blank on said skin member which is lying on said mold surface, such that said narrow edge of said stringer core blank lies conformingly in contact on said second skin surface of said skin member and said broad side faces of said stringer core blank extend away from said skin member, and wherein said narrow edge of said stringer core blank has an edge contour configuration matching said skin contour configuration where said narrow edge is in contact with said second skin surface;

e) providing two flexibly deformable elongate stiffening profile members which are more flexible than said stringer core blank and which comprise a flexible third fiber reinforced composite material and which each respectively include a lengthwise extending base web and a lengthwise extending protruding web that runs along and protrudes from said base web;

f) laying said two stiffening profile members with said protruding webs thereof respectively lying conformingly in contact along said two opposite broad side faces of said stringer core blank and with said base webs thereof respectively lying conformingly in contact along said second skin surface adjacent to said stringer core blank;

g) arranging at least one additional strengthening member to be in contact with said protruding web and said base web of at least one of said two profile stiffening members, wherein said strengthening member consists essentially of a previously cured and hardened fiber reinforced material and has a length extending along said at least one of said stiffening profile members less than said strip length; and h) carrying out a hardening process wherein said stiffening profile members harden and become rigidly and intimately bonded with said stringer core blank and with said skin member, and wherein at least said stringer core blank and said two protruding webs of said two stiffening profile members together form a stiffening and strengthening stringer on said skin member upon completion of said step h).

21. The method according to claim 20, wherein said step c) comprises providing two of said stringer core blanks, wherein said step d) comprises arranging said stringer core blanks spaced apart from each other along said skin member, wherein said step f) comprises laying two of said stiffening profile members so that said protruding webs thereof respectively lie conformingly along said broad side faces of said stringer core blanks that face toward each other, wherein said strengthening member has a U-shaped sectional profile including a base leg and two protruding legs protruding from said base leg, and wherein said step g) comprises arranging said strengthening member so it just fits without gaps between said stringer core blanks and protruding webs such that said protruding legs of said strengthening member lie and press against said protruding webs and such that said strengthening member fixes a spacing distance between said protruding webs lying in contact with said stringer core blanks.

22. The method according to claim 21, wherein said step g) comprises arranging a plurality of said strengthening members respectively spaced apart along said strip length.

23. The method according to claim 22, wherein at least one of said strengthening members is arranged at a middle of said strip length.

24. The method according to claim 20, further comprising removing said at least one additional strengthening member after said step h).

25. The method according to claim 20, further comprising leaving said at least one additional strengthening member permanently in place after said step h).

* * * * *